(12) United States Patent
Hussain et al.

(10) Patent No.: US 10,145,279 B2
(45) Date of Patent: Dec. 4, 2018

(54) METHODS AND SYSTEMS FOR UTILIZING WASTE HEAT FOR A HYBRID VEHICLE

(71) Applicant: Ford Global Technologies, LLC, Dearborn, MI (US)

(72) Inventors: Quazi Ehtesham Hussain, Holland, OH (US); William Samuel Schwartz, Pleasant Ridge, MI (US); David Richens Brigham, Ann Arbor, MI (US); Mark John Jennings, Saline, MI (US); Furqan Zafar Shaikh, Troy, MI (US); Michael Levin, Ann Arbor, MI (US); Donald Masch, White Lake, MI (US); Danrich Henry Demitroff, Okemos, MI (US); James Patrick O'Neill, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 14/827,723

(22) Filed: Aug. 17, 2015

(65) Prior Publication Data

US 2015/0352923 A1 Dec. 10, 2015

Related U.S. Application Data

(62) Division of application No. 14/044,438, filed on Oct. 2, 2013, now Pat. No. 9,169,751.

(51) Int. Cl.
*F01P 3/20* (2006.01)
*F01N 3/02* (2006.01)
(Continued)

(52) U.S. Cl.
CPC ............ *F01N 3/0205* (2013.01); *B60H 1/004* (2013.01); *B60H 1/00492* (2013.01); *B60H 1/04* (2013.01); *F01N 5/02* (2013.01); *F01P 3/20* (2013.01); *F02G 5/02* (2013.01); *F01P 2011/205* (2013.01); *F01P 2060/08* (2013.01); *Y02T 10/16* (2013.01); *Y02T 10/166* (2013.01); *Y10S 903/904* (2013.01)

(58) Field of Classification Search
CPC ...... B60H 1/004; B60H 1/00492; B60H 1/04; F01N 3/0205; F01N 5/02; F01P 3/20; F01P 2011/205; F01P 2060/08; F02G 5/02
See application file for complete search history.

(56) References Cited

U.S. PATENT DOCUMENTS

| 5,553,662 A | 9/1996 | Longardner et al. |
| 6,059,016 A | 5/2000 | Rafalovich et al. |

(Continued)

FOREIGN PATENT DOCUMENTS

WO 2009080153 A1 7/2009

*Primary Examiner* — Phutthiwat Wongwian
*Assistant Examiner* — Matthew T Largi
(74) *Attorney, Agent, or Firm* — David Kelley; McCoy Russell LLP

(57) ABSTRACT

Systems and methods for operating an engine that includes an exhaust gas heat recovery system are described. The system may reduce engine warm-up time and increase an amount of time an engine of a hybrid vehicle is deactivated while the hybrid vehicle is powered by a motor. In one example, a phase change material selectively stores and releases exhaust gas energy from and engine to improve vehicle operation.

10 Claims, 7 Drawing Sheets

(51) Int. Cl.
  *F01N 5/02*    (2006.01)
  *B60H 1/00*    (2006.01)
  *B60H 1/04*    (2006.01)
  *F02G 5/02*    (2006.01)
  *F01P 11/20*    (2006.01)

(56)                References Cited

U.S. PATENT DOCUMENTS

| | | | |
|---|---|---|---|
| 7,353,661 | B2 | 4/2008 | Wang et al. |
| 7,428,816 | B2 | 9/2008 | Singh et al. |
| 2002/0163199 | A1* | 11/2002 | Ramaswamy ......... B60K 6/445 290/40 C |
| 2005/0167169 | A1* | 8/2005 | Gering ............... B60H 1/00278 237/12.3 B |
| 2009/0241863 | A1* | 10/2009 | Kimura ................. B60H 1/025 123/41.1 |
| 2011/0178665 | A1* | 7/2011 | Yoshioka .............. B60W 10/06 701/22 |
| 2012/0045378 | A1 | 2/2012 | Soukhojak et al. |
| 2012/0102934 | A1 | 5/2012 | Magnetto |
| 2012/0152487 | A1* | 6/2012 | Styles ........................ F01N 5/02 165/10 |
| 2012/0168111 | A1 | 7/2012 | Soukhojak et al. |
| 2013/0099012 | A1 | 4/2013 | Roos et al. |
| 2013/0199751 | A1* | 8/2013 | Levin ....................... F02G 5/02 165/10 |
| 2014/0024492 | A1* | 1/2014 | Dextreit ................ B60W 10/02 477/3 |
| 2015/0089943 | A1 | 4/2015 | Hussain et al. |

* cited by examiner

METHODS AND SYSTEMS FOR UTILIZING WASTE HEAT FOR A HYBRID VEHICLE

CROSS REFERENCE TO RELATED APPLICATIONS

The present application is a divisional of U.S. patent application Ser. No. 14/044,438, entitled "METHODS AND SYSTEMS FOR UTILIZING WASTE HEAT FOR A HYBRID VEHICLE," filed on Oct. 2, 2013, the entire contents of which are hereby incorporated by reference for all purposes.

FIELD

The present description relates to a system and method for recovering waste heat of a hybrid vehicle. The system and methods described herein provide for recovering heat from exhaust gases to reduce engine warm-up time and extending engine off time.

BACKGROUND AND SUMMARY

An internal combustion engine may be combined with an electric machine to provide torque to propel a vehicle. The internal combustion engine provides rotational torque to the vehicle driveline as well as vacuum for operating various actuators and heat for the vehicle's passenger cabin. The electric machine may provide torque to propel the vehicle and it may also be operated as a generator to charge a vehicle battery. However, if the electric machine is propelling the vehicle when the engine is stopped and ambient temperature is low, an electrical heater may have to be used to heat the passenger cabin. Operating the electric heater may reduce the amount of time the engine may be deactivated since the electric heater consumes battery charge. Thus, vehicle fuel conservation may be reduced by operating the passenger cabin heater.

The inventors herein have recognized the above-mentioned disadvantages and have developed an engine system, comprising: an engine including an exhaust gas heat exchanger positioned along an exhaust system; a thermal energy storage device in fluidic communication with the exhaust gas heat exchanger; and an engine coolant heat exchanger in thermal communication with the thermal energy storage device.

By extracting engine exhaust gas heat to a thermal energy storage device, it may be possible to provide the technical result of propelling a vehicle and maintaining a passenger cabin temperature while an engine has stopped rotating. In particular, the thermal energy storage device may store exhaust gas energy while the engine is combusting an air-fuel mixture, and thermal energy may be released from the thermal energy storage device while the engine has stopped rotating while an electric machine is propelling the vehicle. In this way, it may be possible to provide heat to the vehicle cabin without consuming electrical energy in an electrical heater. In some examples, an engine coolant pump may be activated when heating the passenger cabin instead of operating an electric heater so that electrical power consumption may be reduced.

The present description may provide several advantages. In particular, the approach may extend an amount of time a hybrid vehicle may operate without activating an engine. Additionally, the approach may improve engine starting emissions and fuel economy by reducing engine warm-up time. Further, the approach may be realized with a limited amount of hardware.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
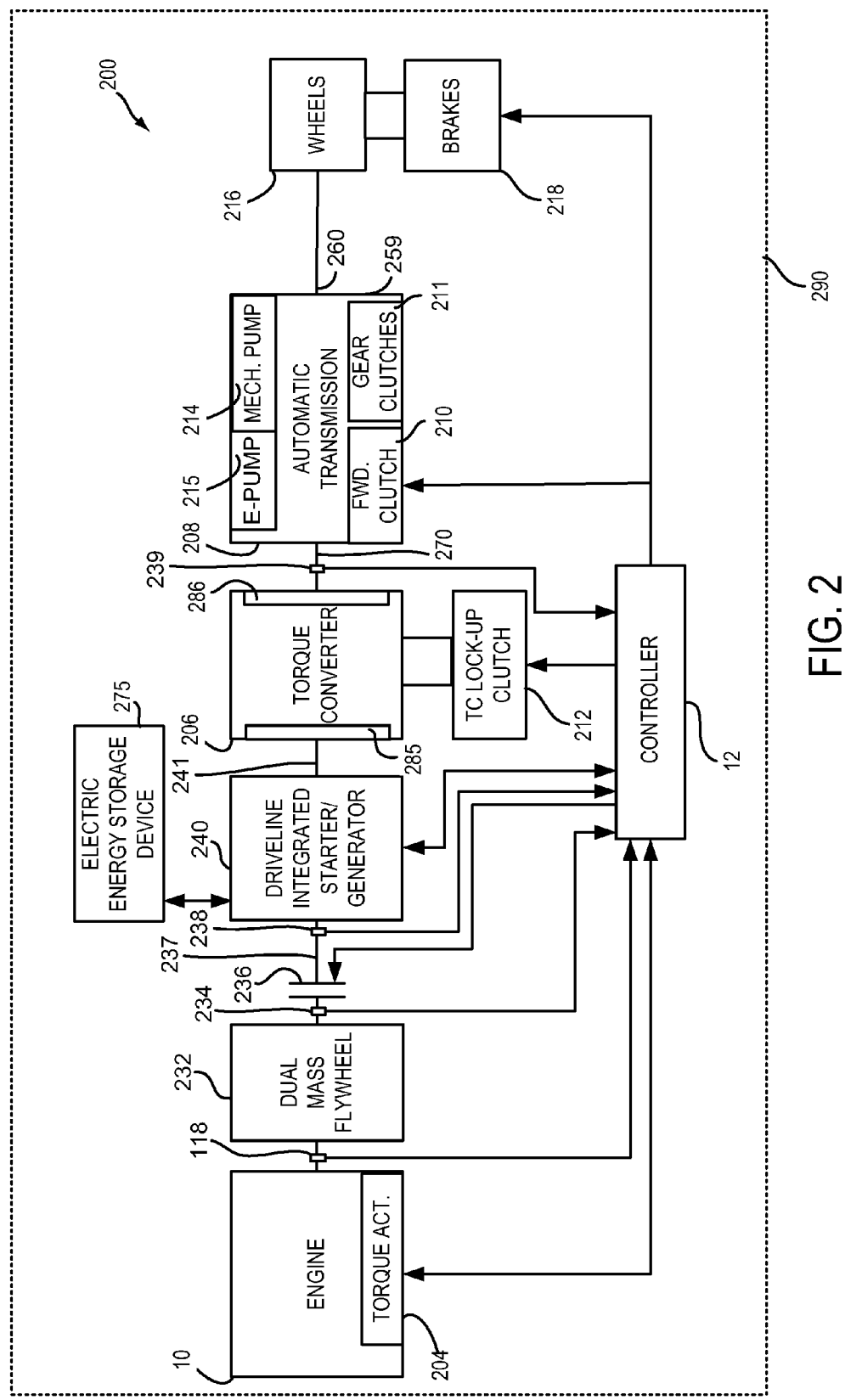
FIG. 2 shows an example vehicle driveline configuration.
Figure 3:
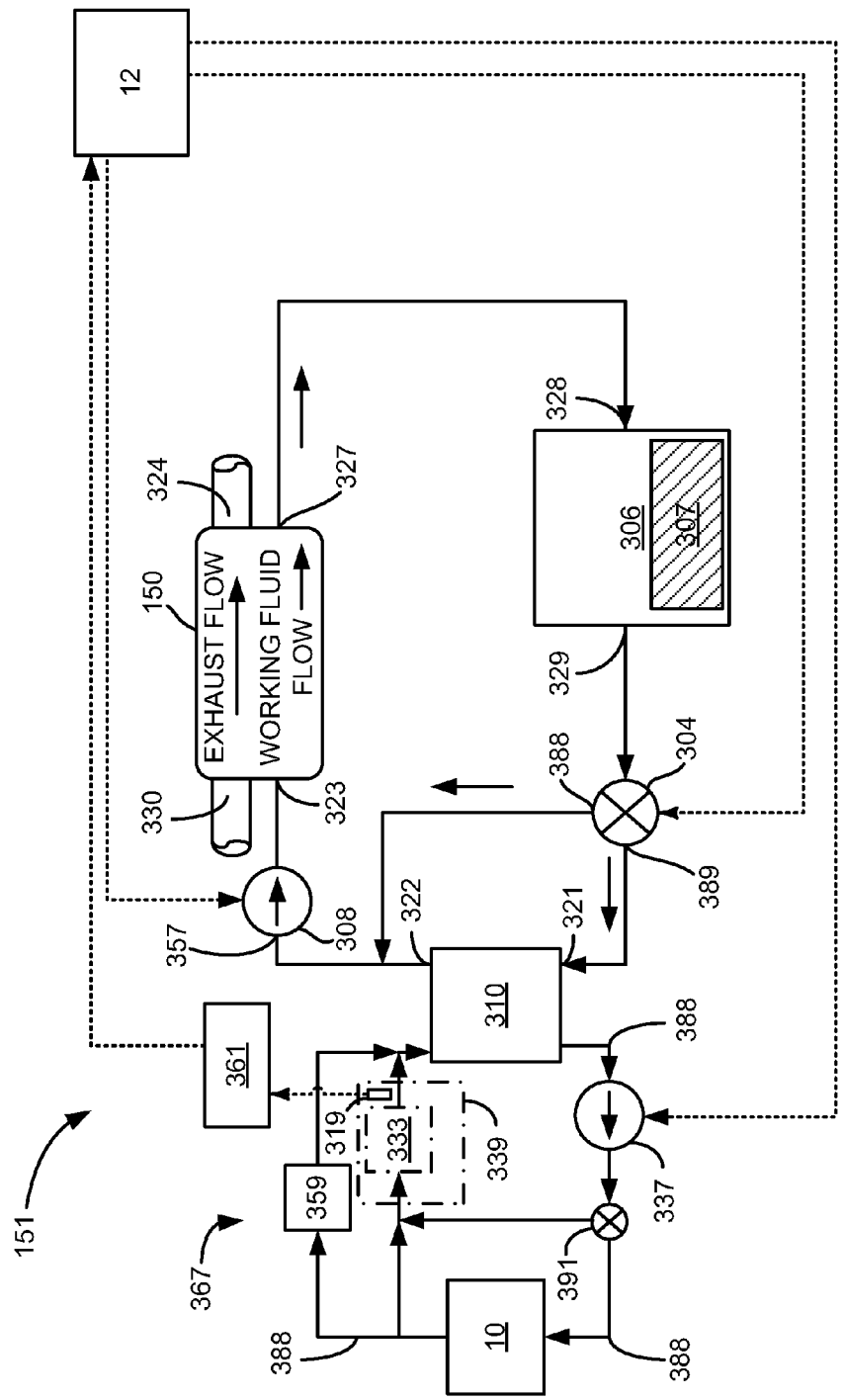
FIG. 3 shows a schematic view of an exhaust gas heat recovery system.

The present description is related to recovering energy from engine exhaust gases and using the recovered energy to improve vehicle operation. The systems and methods described herein may be applied to hybrid vehicles that include an engine and a motor as well as non-hybrid vehicles (e.g., engines that may be automatically stopped and started). Exhaust gas energy may be recovered from an engine of the type described in FIG. 1, or a diesel engine. The engine may be part of a hybrid vehicle as is shown in FIG. 2. Energy may be extracted from engine exhaust gases via an exhaust gas energy recovery system as is shown in FIG. 3. The exhaust gas energy recovery system may be operated according to the method described by the flowchart shown in FIGS. 4 and 5. The engine and exhaust gas heat recovery system may be operated as shown in the sequence of FIG. 6.

Figure 1:
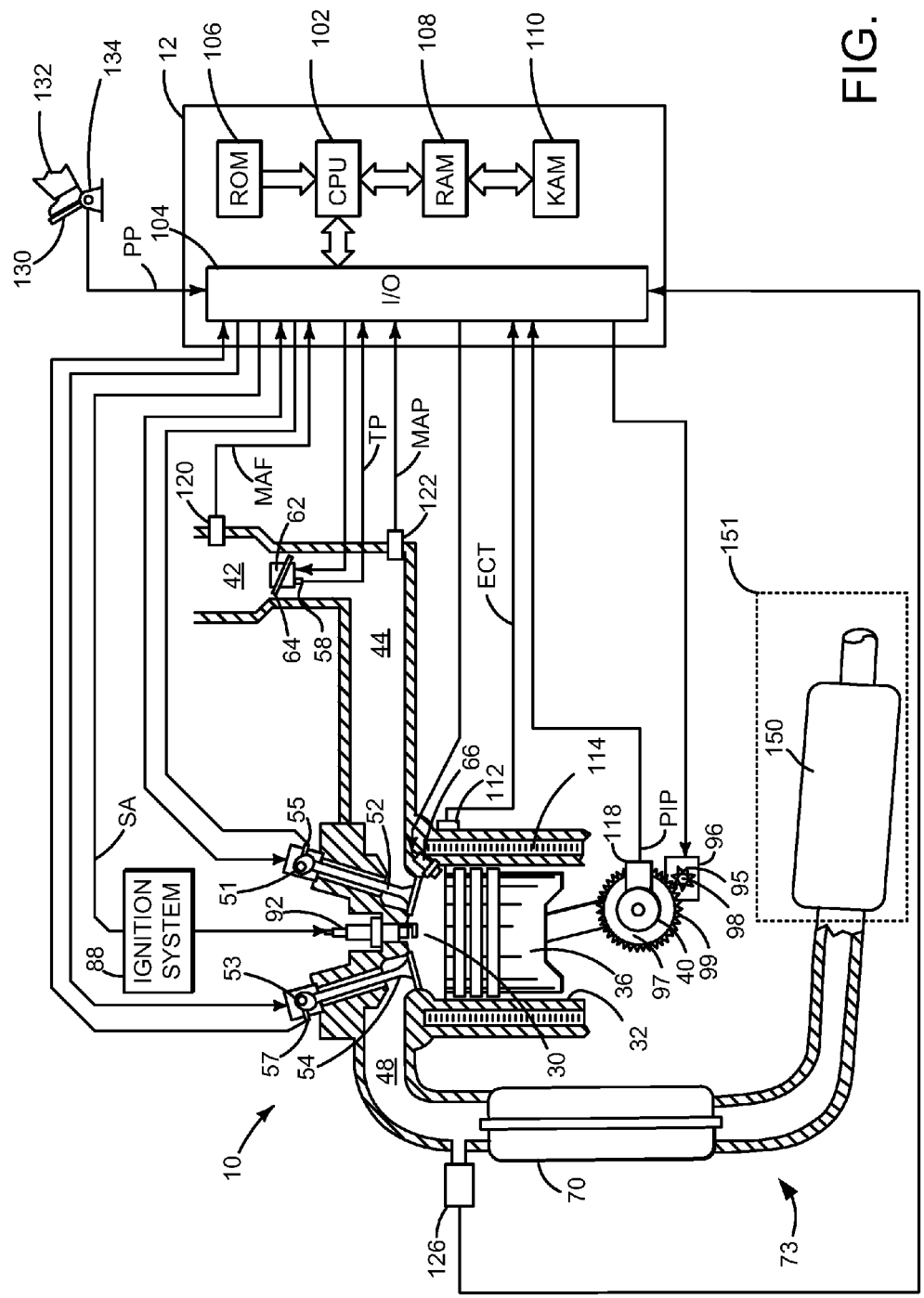
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70 in exhaust system 73. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. The exhaust system also includes an exhaust heat exchanger 150 for extracting energy from exhaust gases. Exhaust heat exchanger 150 is shown positioned in the exhaust system of engine 10 downstream of converter 70 and it is part of exhaust gas heat recovery system 151. Alternatively, exhaust heat exchanger 150 may be positioned upstream of converter 70.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via driveline integrated starter/generator (DISG) 240. Further, engine 10 may generate or adjust torque via torque actuator 204, such as a fuel injector, throttle, camshaft, valve lift, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 may be positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is hydraulically operated via controller 12 adjusting a position of a control valve. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285 (e.g., a hydraulic torque path), thereby enabling torque multiplication. In contrast, when torque converter lock-up clutch 212 is fully engaged, the engine output torque is directly transferred via the torque converter clutch to an input shaft (not shown) of transmission 208 (e.g., the friction torque path). Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-N where N is an integer number between 4-10) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may control the engagement of wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical pump 214 may supply pressurized transmission fluid to automatic transmission 208 providing hydraulic pressure to engage various clutches, such as forward clutch 210, gear clutches 211, engine disconnect clutch 236, and/or torque converter lock-up clutch 212. Mechanical pump 214 may be operated in accordance with torque converter 206, and may be driven by the rotation of the engine or DISG via input shaft 241, for example. Thus, the hydraulic pressure generated in mechanical pump 214 may increase as an engine speed and/or DISG speed increases, and may decrease as an engine speed and/or DISG speed decreases.

An electric pump 215 may also be provided to increase transmission line pressure when the DISG is spinning at speeds less than 300 RPM for example. Electric pump 215 may be selectively operated via controller 12 in response to DISG speed. Thus, mechanical pump 214 may supply transmission line pressure when the DISG speed is greater than a threshold speed while electrical pump 215 is not activated. However, when DISG speed is less than the threshold speed, electrical pump 215 may be activated to supply transmission line pressure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When engine stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

Referring now to FIG. 3, a detailed schematic of an exhaust gas heat recovery system 151 is shown. The exhaust gas heat recovery system 151 is included in the system of FIGS. 1 and 2. Exhaust gas heat recovery system 151 may be controlled via the method of FIGS. 4 and 5. The direction of working fluid flow is indicated by the arrows. Electrical control lines are shown as dashed lines while fluidic lines are shown as solid lines.

In a first mode, exhaust heat exchanger 150 transfers heat energy from engine exhaust gases to a working fluid that flows through exhaust heat exchanger 150. Working fluid may be comprised of a glycol/water mixture, carbon hydrides, or other heat transfer medium. Working fluid enters exhaust heat exchanger 150 where its temperature may be increased via exhaust gases. Engine exhaust gas enters exhaust heat exchanger 150 at exhaust inlet 330 and exits at exhaust outlet 324. Working fluid or heat transfer medium (e.g., liquid) enters exhaust heat exchanger 150 at heat transfer medium input 323 and exits exhaust heat exchanger 150 at heat transfer medium outlet 327.

Working fluid exits the exhaust heat exchanger and enters thermal energy storage device 306 where heat is transferred from the working fluid to a thermal storage medium or device. In one example, the thermal storage medium or device is a phase changing material that is in a liquid state at higher temperatures. The phase changing material is in a solid state at lower temperatures. Alternatively, the thermal storage medium may remain in a single state at lower and higher temperatures. Working fluid enters thermal energy storage device at inlet 328 and exits at outlet 329.

In a second mode, working fluid exits the exhaust heat exchanger and its temperature is increased via passing the working fluid through the thermal energy storage device 306. Heat is released by thermal energy storage device 306 when a temperature of working fluid is less than a temperature of thermal energy storage device 306. In these ways, thermal energy storage device 306 may store and release thermal energy.

Working fluid exits thermal energy storage device 306 and enters bypass valve 304. Bypass valve 304 may direct the working fluid to engine coolant heat exchanger 310 or around engine coolant heat exchanger 310 and directly to electrically actuated pump 308. Controller 12 adjusts the operating state of bypass valve 304 in response to operating vehicle operating conditions. In a first mode where thermal energy storage device 306 is storing thermal energy from engine exhaust gas in thermal energy storage media 307, bypass valve 304 directs working fluid around engine coolant heat exchanger and solely to pump 308. In a second mode where thermal energy storage device 306 is releasing energy from thermal energy storage media 307, bypass valve 304 directs working fluid solely to inlet 321 of engine coolant heat exchanger 310. Working fluid exits engine coolant heat exchanger 310 at outlet 322. In a third mode, where thermal energy storage device 306 is releasing energy from thermal energy storage media 307, bypass valve 304 directs working fluid into a combination of inlet 321 of engine coolant heat exchanger 310 and around the engine coolant heat exchanger 310 to pump 308.

Working fluid enters pump 308 at inlet 357 via engine coolant heat exchanger or bypass valve 304. Pump 308 increases working fluid pressure and causes working fluid to flow within exhaust gas heat recovery system 151.

Engine cooling circuit 367 circulates engine coolant (e.g., water and glycol) to cool engine 10 and warm cabin 339. Engine 10 includes a mechanically driven coolant pump (not shown) that operates when engine 10 is rotating. Engine cooling circuit 367 may include an optional electrically actuated engine coolant pump 337 that is activated and deactivated via controller 12. Engine coolant enters electric engine coolant pump 337 from engine coolant heat exchanger 310. Electric engine coolant pump 337 directs engine coolant to valve 391. Valve 391 may direct engine coolant solely to engine 10, solely to cabin heater core 333, or to both engine 10 and cabin heater core 333.

Coolant passing through engine 10 may be directed to radiator 359 and/or cabin heater core 333 via engine coolant passages 388. Ambient air passes through radiator 359 to cool engine coolant when engine coolant is at a higher temperature than ambient air temperature. Cabin air may be passed over cabin heater core 333 to extract thermal energy from engine 10 or from thermal energy storage device 306 which has been transferred into engine cooling circuit 367 via engine coolant heat exchanger 310. Cabin climate control system 361 may sense cabin temperature via temperature sensor 319 and request heat be delivered to the vehicle cabin in response to the desired cabin temperature and the actual cabin temperature as determined by temperature sensor 319. Heat is delivered to cabin 339 when engine 10 is stopped via directing engine coolant from pump 337 to heater core 333 via bypass valve 391. Heat may be delivered to cabin 339 via heater core 333 and pump 337 when engine 10 is cold via directing output from pump 337 to heater core 333 via bypass valve 391. Pump 337 may be deactivated in some examples when engine 10 is operating.

Thus, the system of FIGS. 1-3 provides for an engine system, comprising: an engine including an exhaust gas heat exchanger positioned along an exhaust system; a thermal energy storage device in fluidic communication with the exhaust gas heat exchanger; and an engine coolant heat exchanger in thermal communication with the thermal energy storage device. The engine system includes where the thermal energy storage device includes a phase changing media that changes between liquid and solid phases. The engine system further comprises a first electrically driven pump in fluidic communication with the exhaust gas heat exchanger and the engine coolant heat exchanger.

In some examples, the engine system further comprises a bypass valve that directs a working fluid from the thermal energy storage device through the engine coolant heat exchanger or around the engine coolant heat exchanger. The engine system further comprises a controller, the controller including non-transitory instructions stored in memory to adjust a state of the bypass valve in response to a request to heat a passenger cabin. The engine system further comprises a second electrically drive pump, the second electrically driven pump positioned within an engine cooling circuit that includes an engine, a heater core, and a radiator. The engine system further comprises a valve that is in direct fluidic communication with the engine and the heater core.

Figure 4:
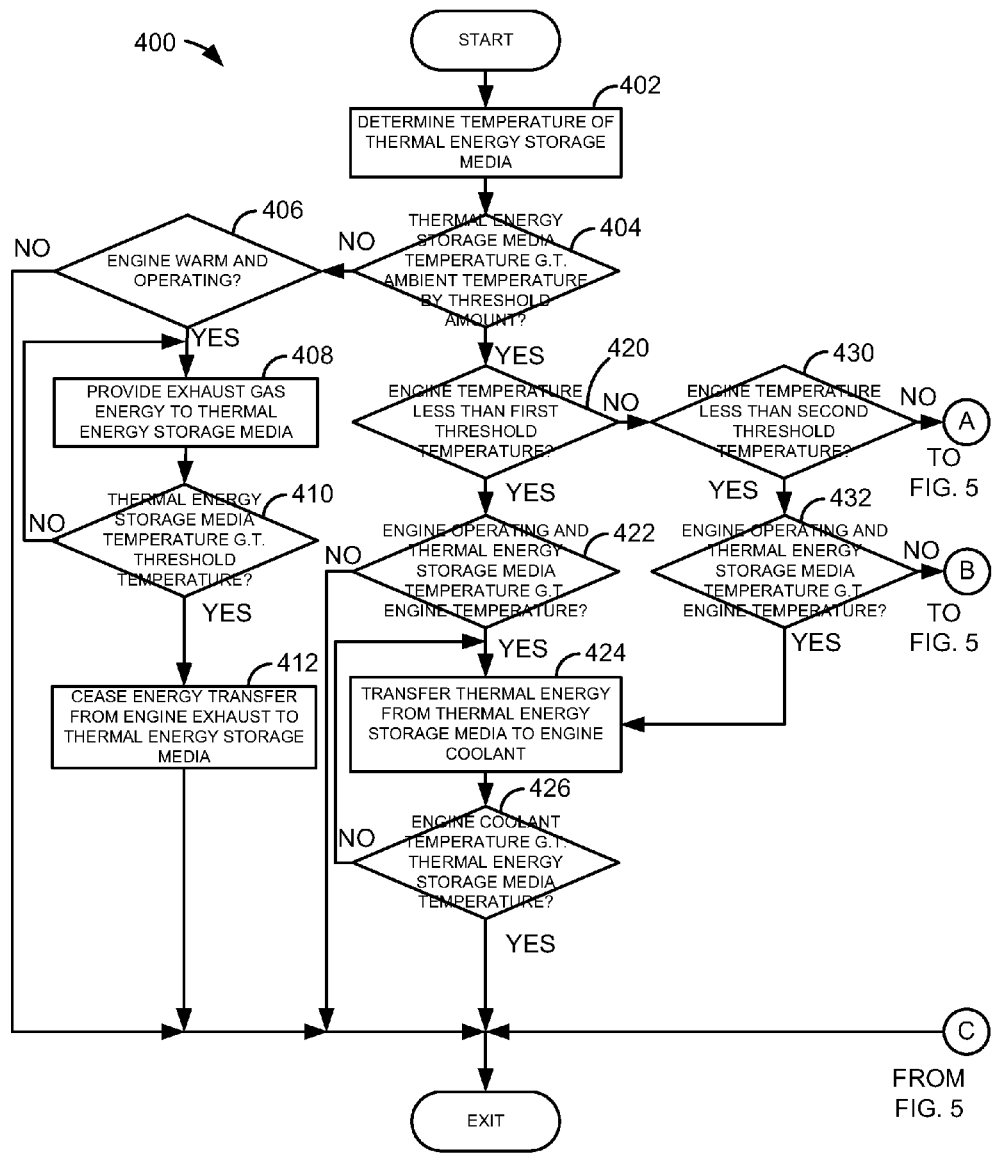
FIGS. 4 and 5 show a flowchart for a method for recovering and utilizing exhaust gas energy.
Figure 5:
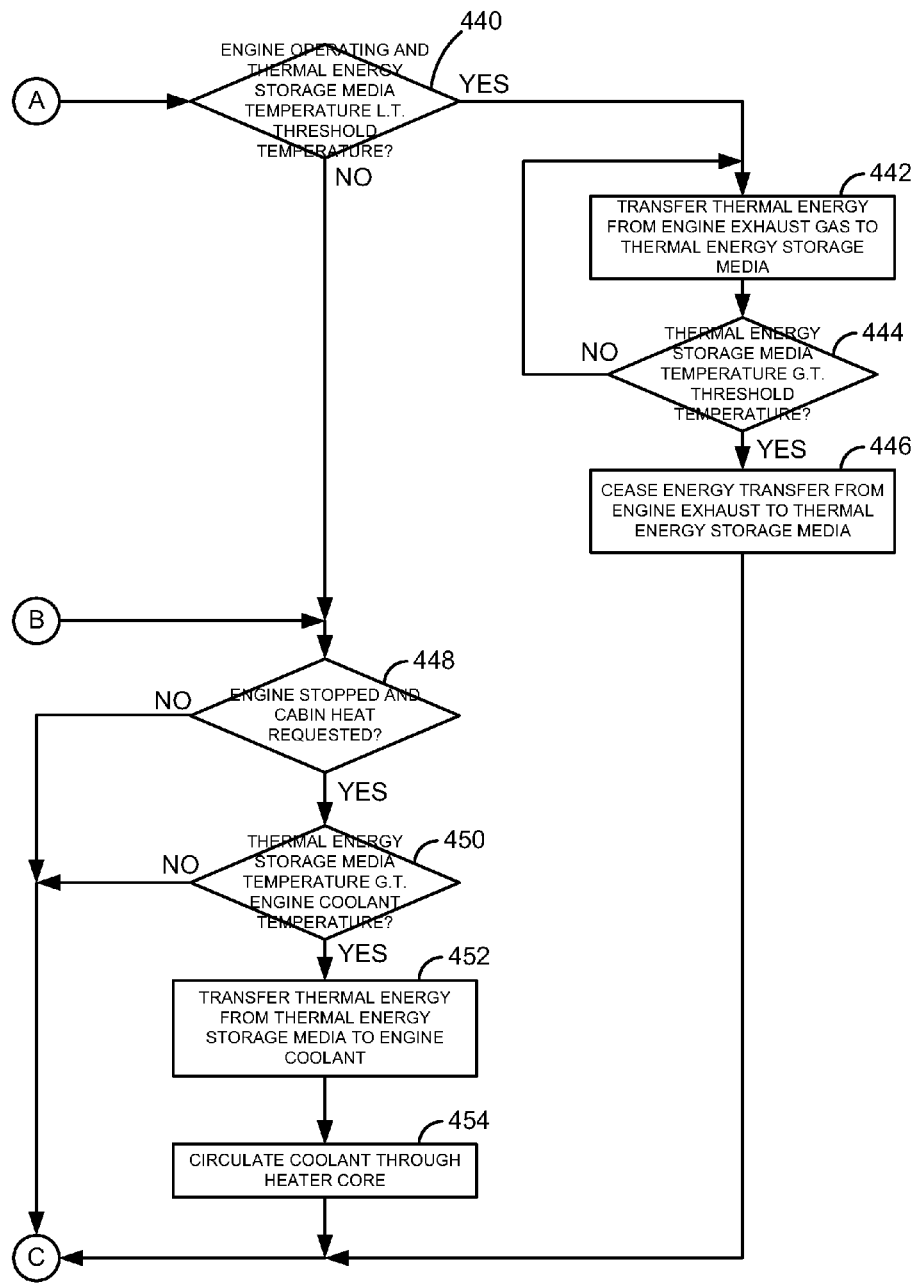
Figure 6:
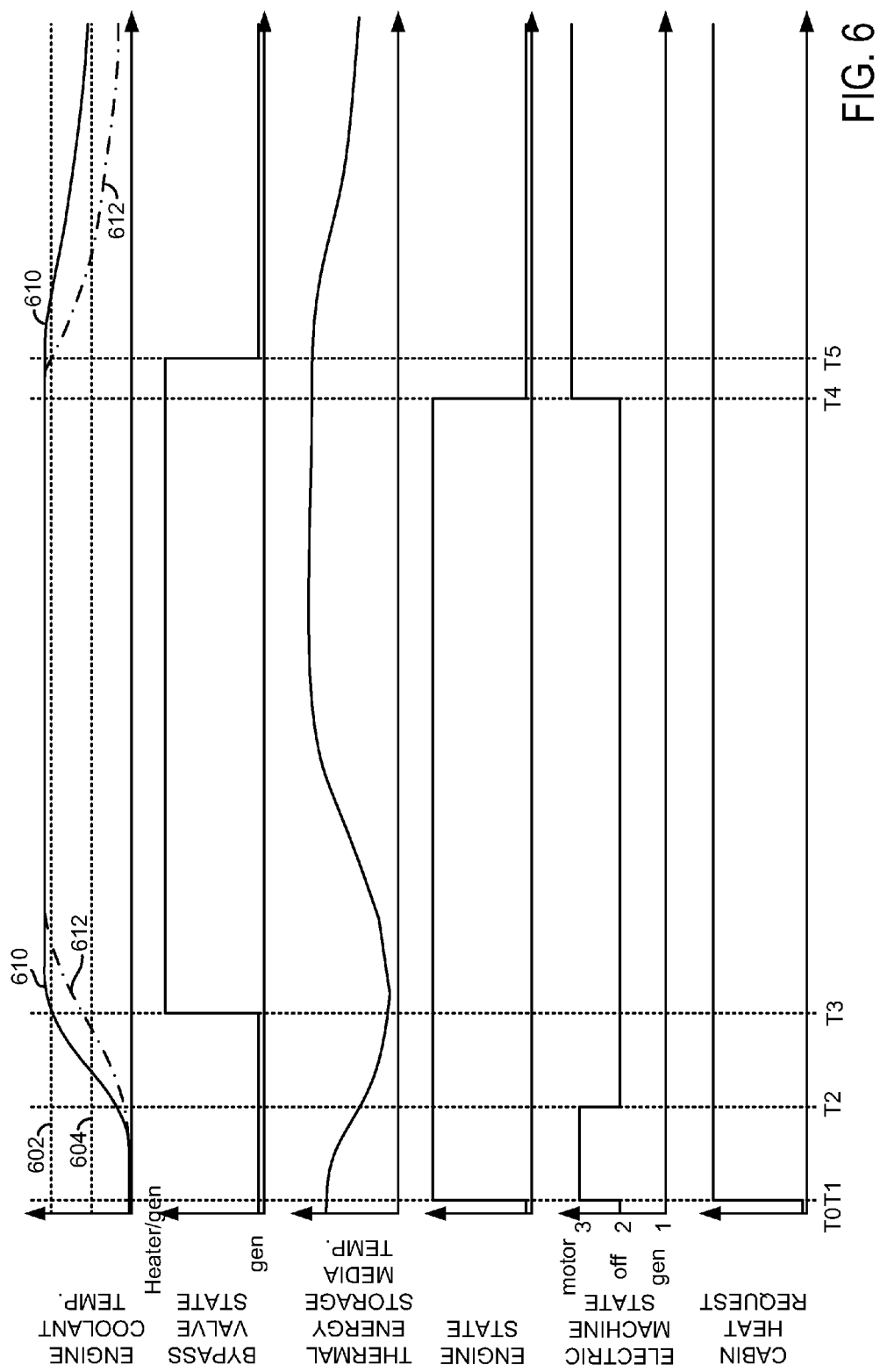
FIG. 6 shows an example prophetic engine operating sequence for a hybrid vehicle.

Referring now to FIGS. 4 and 5, a flowchart for a method for recovering and utilizing exhaust gas energy in a vehicle is shown. The method of FIGS. 4 and 5 may be stored as executable instructions in non-transitory memory of the system shown in FIGS. 1-3. Further, the method of FIGS. 4 and 5 may provide the prophetic operating sequence shown in FIG. 6.

At 402, method 400 determines a temperature of a thermal energy storage media. In one example, the thermal energy storage media is a phase changing material that is in a liquid phase at higher engine temperatures. At lower temperatures, the phase changing material is in a solid phase. The temperature of the phase changing material may be determined via a thermistor, thermocouple, or other temperature sensing device. In still other examples, the thermal storage media may remain in a single state at higher and lower temperatures. Method 400 proceeds to 404 after the thermal storage media temperature is determined.

At 404, method 400 judges whether or not the temperature of the thermal storage media is greater than (G.T.) ambient temperature by a threshold amount (e.g., 5 degrees Celsius). If method 400 judges that the thermal storage media is at a greater temperature than ambient temperature plus a threshold amount, the answer is yes and method 400 proceeds to 420. Otherwise, the answer is no and method 400 proceeds to 406.

At 406, method 400 judges whether or not the engine is warm and operating. The engine may be determined to be operating when the engine is rotating and combusting mixtures of air and fuel. The engine may be determined to be warm when engine temperature is greater than a threshold temperature (e.g., 88 degrees Celsius). If method 400 judges that the engine is operating and warm, the answer is yes and method 400 proceeds to 408. Otherwise, the answer is no and method 400 proceeds to exit. Thus, if the thermal energy storage media is low and the engine is not warm and operating, the thermal energy storage media does not provide thermal energy to the engine or the cabin heater.

At 408, method 400 provides thermal energy from engine exhaust gases to the thermal energy storage media. In one example, bypass valve 304 is positioned to direct working fluid around coolant heat exchanger 310 and solely to pump 308 so that the working fluid is heated via exhaust gas in the exhaust heat exchanger 150

At 410, method 400 judges whether or not a temperature of the thermal energy storage media (e.g., 306 of FIG. 3) is greater than a threshold temperature. The threshold temperature may be a warmed-up engine temperature (e.g., 90 degrees Celsius) or a temperature related to exhaust gas temperature. If method 400 judges that a temperature of the thermal energy storage media is greater than the threshold temperature, the answer is yes and method 400 proceeds to 412. If method 400 judges that a temperature of the thermal energy storage media is less than the threshold temperature, the answer is no and method 400 returns to 408.

At 412, method 400 ceases to transfer energy from the engine exhaust gases to the thermal energy storage media. In one example, method 400 stops rotation of pump 308 to stop flow of working fluid, thereby ceasing energy transfer from engine exhaust gases to the thermal energy storage media. In other examples, a valve may be closed or other actions may be taken to stop energy transfer from engine exhaust gases to the energy storage media. Method 400 proceeds to exit after energy transfer is stopped.

At 420, method 400 judges whether or not engine temperature is less than a first threshold temperature. In one example, the first threshold temperature is greater than ambient temperature and less than warmed-up engine temperature. For example, the first threshold temperature may be 55 degrees Celsius. If method 400 judges that engine temperature is less than the first threshold temperature, the answer is yes and method 400 proceeds to 422. Otherwise, the answer is no and method 400 proceeds to 430.

At 422, method 400 judges whether or not the engine is operating and a temperature of the thermal energy storage media is greater than engine temperature (e.g., engine coolant temperature or cylinder head temperature). If method 400 judges that the engine is operating and that a temperature of the thermal energy storage media is greater than engine temperature, the answer is yes and method 400 proceeds to 424. Otherwise, the answer is no and method 400 exits.

At 424, method 400 begins transferring thermal energy from the thermal energy storage media to the engine. In one example, thermal energy is transferred from the thermal energy storage media 307 to the engine via activating pump 308 and adjusting a position of bypass valve 304 so that working fluid exits thermal energy storage device 306 and enters engine coolant heat exchanger 310. Engine coolant is heated via the working fluid in the exhaust gas heat recovery system, and engine coolant is directed to the engine to heat the engine. In this way, thermal energy from working fluid that is at a temperature that is higher than engine temperature is transferred from the thermal energy storage device to the engine.

The engine is heated by adjusting valve 391 so that engine coolant is supplied from engine coolant heat exchanger 310 solely to engine 10. The engine pump may drive engine coolant flow or pump 391 may also be activated. The engine coolant increases engine temperature and engine coolant is recirculated back to engine coolant heat exchanger 310. Radiator 359 and heater core 333 may be bypassed. Method 400 proceeds to 426 after heat begins to transfer from the thermal energy storage media 307 to engine 10.

At 426, method 400 judges whether or not engine coolant temperature is greater than a temperature of the thermal energy storage media. If method 400 judges that the temperature of the thermal energy storage media is greater than the temperature of the thermal energy storage media, the answer is yes and method 400 proceeds to exit. Otherwise, the answer is no and method 400 returns to 424. Additionally, method 400 may deactivate pumps 337 and 308 when engine temperature is greater than the temperature of the thermal energy storage media when the thermal energy storage media is not being recharged to a higher temperature.

At 430, method 400 judges whether or not an engine temperature is less than a second threshold temperature (e.g. a warmed-up engine temperature). If so the answer is yes and method 400 proceeds to 432. Otherwise, the answer is no and method 400 proceeds to 440 of FIG. 5.

At 432, method 400 judges whether or not the engine is operating and a temperature of the thermal energy storage media is greater than an engine temperature. If so, the answer is yes and method 400 proceeds to 424. Otherwise, the answer is no and method 400 proceeds to 448 of FIG. 5.

At 440, method 400 judges whether or not the engine is operating and a temperature of the thermal energy storage media is less than (L.T.) a threshold temperature. The threshold temperature may be an engine operating temperature or rated temperature of the thermal energy storage media. If method 400 judges that the engine is operating and the temperature of the thermal energy storage media is less than the threshold temperature, the answer is yes and method 400 proceeds to 442. Otherwise, the answer is no and method 400 proceeds to 448.

At 448, method 400 judges whether or not the engine is stopped and cabin heat is being requested. Cabin heat may be requested via a climate control system. In one example, cabin heat is requested when cabin temperature is less than a desired temperature. If method 400 judges that the engine is stopped and cabin heat is requested, the answer is yes and method 400 proceeds to 450. Otherwise, the answer is no and method 400 proceeds to exit.

At 450, method 400 judges whether or not a temperature of the thermal energy storage media is greater than an engine coolant temperature. If so, the answer is yes and method 400 proceeds to 452. Otherwise, the answer is no and method 400 restarts the engine to provide heat to the cabin and exits.

At 452, method 400 transfers thermal energy from the thermal energy storage media to engine coolant. Method 400 transfers thermal energy from the thermal energy storage media to engine coolant via activating pump 308 and adjusting a position of bypass valve 304 so that working fluid exits thermal energy storage device 306 and enters engine coolant heat exchanger 310. Engine coolant is heated within engine coolant heat exchanger 310 via the working fluid in the exhaust gas heat recovery system, and engine coolant is directed from engine coolant heat exchanger 310 solely to cabin heater core 333. In this way, thermal energy from working fluid that is at a temperature that is higher than engine coolant temperature is transferred from the thermal energy storage device to the cabin heater core and the cabin.

The cabin heater core 333 is heated by adjusting valve 391 so that engine coolant is supplied from engine coolant heat exchanger 310 solely to heater core 333. Pump 391 is activated to move warm engine coolant to heater core 333. The engine coolant temperature decreases after passing through heater core 333 and engine coolant is recirculated back to engine coolant heat exchanger 310. Method 400 proceeds to 454 after heat begins to transfer from the thermal energy storage media 307 to heater core 333.

At 454, method 400 circulates engine coolant through the cabin heater core. In one example, an electric pump (e.g., 391 of FIG. 3) is activated to circulate engine coolant through the heater core so that heat may be continuously delivered to the passenger cabin. Method 400 proceeds to exit after the engine coolant begins to circulate.

At 442, method 400 provides thermal energy from engine exhaust gases to the thermal energy storage media. In one example, bypass valve 304 is positioned to direct working fluid from valve 304 around coolant heat exchanger 310 and solely to pump 308 so that the working fluid is heated via exhaust gas in the exhaust heat exchanger 150. The working fluid is returned to thermal energy storage device 306 and thermal energy storage media 307. Method 400 proceeds to 444 after energy begins to transfer from engine exhaust gases to the thermal energy storage media 307.

At 444, method 400 judges whether or not a temperature of the thermal energy storage media 307 in energy storage device 306 of FIG. 3 is greater than a threshold temperature. The threshold temperature may be a warmed-up engine temperature (e.g., 90 degrees Celsius) or a temperature related to exhaust gas temperature. If method 400 judges that a temperature of the thermal energy storage media 307 is greater than the threshold temperature, the answer is yes and method 400 proceeds to 446. If method 400 judges that a temperature of the thermal energy storage media is less than the threshold temperature, the answer is no and method 400 returns to 442.

At 446, method 400 ceases to transfer energy from the engine exhaust gases to the thermal energy storage media 307. In one example, method 400 stops rotation of pump 308 to stop flow of working fluid, thereby ceasing energy transfer from engine exhaust gases to the thermal energy storage media 307. In other examples, a valve may be closed or other actions may be taken to stop energy transfer from engine exhaust gases to the energy storage media. Method 400 proceeds to exit after energy transfer is stopped.

Thus, the method of FIGS. 4 and 5 provides for a method for operating an engine, comprising: operating an engine; transferring engine exhaust gas heat energy from the engine to a thermal energy storage device via an engine exhaust gas heat exchanger; and transferring heat energy from the thermal energy storage device to a passenger cabin heater core while the engine has stopped rotating. The method includes where heat is transferred to the thermal energy storage device from the engine exhaust gas heat exchanger while a bypass valve that is in fluidic communication with the thermal energy storage device is in a first position. The method includes where heat is transferred from the thermal energy storage device while the bypass valve is in a second position.

In one example, the method further comprises activating an electrically operated pump that is in fluidic communication with the passenger cabin heater core in response to a request for cabin heat. The method further comprises adjusting a position of a bypass valve in an exhaust gas heat recovery system in response to a temperature of an engine. The method further comprises transferring heat energy from the thermal energy storage device to an engine while engine temperature is less than a temperature of the thermal energy storage device. The method includes where heat energy from the thermal energy storage device is transferred via an engine coolant heat exchanger.

In another example, the method of FIGS. 4 and 5 provides for a method for operating an engine, comprising: operating an engine; storing energy in exhaust gases from the engine to a phase change material; and releasing energy stored in the phase change material to an engine coolant heat exchanger, the engine coolant heat exchanger in fluidic communication with the engine and a passenger cabin heater core. The method includes where releasing energy stored in the phase change material occurs when engine coolant temperature is less than a threshold temperature and in response to a passenger cabin heat request. The method further comprises adjusting a bypass valve to a first position to store energy in exhaust gases to the phase change material. The method further comprises adjusting a position of the bypass valve to a second position to release energy store in the phase change material. The method includes where releasing energy stored in the phase change material occurs when the engine is stopped. The method further comprises activating an electrically actuated pump to circulate engine coolant through the passenger cabin heater core when releasing energy stored in the phase change material.

Referring now to FIG. 6, an example prophetic engine operating sequence for a hybrid vehicle is shown. The sequence of FIG. 6 may be provided via the method of FIGS. 4 and 5 operating in the system of FIGS. 1-3. Vertical lines T0-T5 represent times of interest in the sequence. Each of the plots occurs at the same time as the other plots.

The first plot from the top of FIG. 6 is a plot of engine coolant temperature versus time. The X axis represents time and time increases from the left side of FIG. 6 to the right side of FIG. 6. The Y axis represents engine coolant temperature and engine coolant temperature increases in the direction of the Y axis arrow. The horizontal line 604 represents a first engine threshold temperature. The horizontal line 602 represents a second engine threshold temperature. Trace 610 is an example of engine coolant temperature with the exhaust heat recovery system. Trace 612 is an example of engine coolant temperature without the exhaust heat recovery system.

The second plot from the top of FIG. 6 is a plot of bypass valve state (e.g., valve 304 operating state) versus time. The X axis represents time and time increases from the left side of FIG. 6 to the right side of FIG. 6. The Y axis represents bypass valve state. The bypass valve routes working fluid from thermal energy storage device 306 to engine coolant heat exchanger 310 when the trace is at a lower level (e.g., pass through, second mode). The bypass valve routes working fluid from thermal energy storage device 306 solely to inlet 357 of pump 308 when the trace is at a higher level (e.g., bypass operation, first mode).

The third plot from the top of FIG. 6 is a plot of thermal energy storage media temperature versus time. The X axis represents time and time increases from the left side of FIG. 6 to the right side of FIG. 6. The Y axis represents thermal energy storage media temperature and thermal energy storage media temperature increases in the direction of the Y axis arrow.

The fourth plot from the top of FIG. 6 is a plot of engine operating state versus time. The X axis represents time and time increases from the left side of FIG. 6 to the right side of FIG. 6. The Y axis represents engine operating state. The engine is operating when the engine operating state trace is at a higher level. The engine is stopped rotating when the engine operating state trace is at a lower level.

The fifth plot from the top of FIG. 6 is a plot of electric machine (e.g., DISG) state versus time. The X axis represents time and time increases from the left side of FIG. 6 to the right side of FIG. 6. The Y axis represents electric machine state. Three electric machine states are numerically indicated along the Y axis. The electric machine or DISG 240 is operating as a motor (e.g., providing positive torque to the driveline) in the third operating state indicated by numeral three. The electric machine is operating in an off state in the second operating state indicated by numeral two. The electric machine is operating in a generator (e.g., converting mechanical energy into electrical energy and providing a negative torque to the driveline) state in the first operating state indicated by numeral one.

The sixth plot from the top of FIG. 6 is a plot of a passenger cabin heat request versus time. A heat request may be made by a climate control system or a driver. A heat request is not present when the trace is at a lower level. A heat request is present when the trace is at a higher level. The heat request may be made to increase cabin temperature.

At time T0, the engine coolant temperature is at a low level, the bypass valve is prepositioned to the lower level (e.g., second operating mode), and the engine is off as indicated by the engine state trace being at a lower level. The temperature of the thermal energy storage device is at a higher level and the electric machine is off. The cabin heat request is at a lower level indicating that cabin heating is not requested. Conditions at time T0 may be indicative of cold engine start conditions. Thus, the vehicle may be stopped and engine temperature may be below normal operating temperature.

At time T1, the engine state transitions to a higher level to indicate that the engine is started. The engine may be started in response to a driver or controller engine start request. A driver engine start request may be made via a key switch or pushbutton. The electric machine state transitions from an off state to a motor state in response to the engine start request (not shown). The electric machine may rotate the engine for starting at time T1. The bypass valve (e.g., 304) state remains at a lower level indicating that working fluid may pass through the engine coolant heat exchanger (e.g., 310) from the thermal energy storage device (e.g., 306) if when the exhaust heat recovery system pump (e.g., 308) is activated. In this example, the exhaust heat recovery pump is activated at engine start in response to the temperature of the thermal energy storage device being greater than engine coolant temperature. By activating the pump and positioning the bypass valve as described, heat may be transferred from the thermal energy storage device to engine coolant and the engine block via the engine coolant heat exchanger. The driver requests cabin heat as indicated by the cabin heat request state being at a higher level. In this way, exhaust energy may be directed to engine coolant to warm the engine more quickly. The engine coolant temperature is less than first threshold 604, but it begins to increase.

At time T2, the electric machine is turned off as indicated by the electric machine state trace. The engine coolant temperature is increasing, but it has not reached the first threshold temperature 604. Engine coolant temperature with the exhaust heat recovery system 610 is increased at a faster rate than engine coolant temperature without the exhaust heat recovery system 612. The bypass valve remains in a state where thermal energy is transferred from the thermal energy storage device 306 to engine 10 via engine coolant heat exchanger 310. The thermal energy storage device temperature (e.g., a temperature of media in the thermal energy storage device) is decreasing as thermal energy is transferred from the thermal energy storage device to the engine. The engine continues to operate and combust air-fuel mixtures and the driver continues to request cabin heat.

At time T3, the bypass valve state changes in response to engine coolant temperature. In particular, the bypass valve changes state to allow engine exhaust gases to recharge or increase the temperature of the thermal energy storage system media. Engine coolant temperature exceeds the threshold temperature 602 which indicates the engine is at a warmed-up operating temperature. Since the temperature of the thermal energy storage device media is at a lower level, it is recharged in response to the temperature of the thermal energy storage device being less than a threshold temperature (e.g., lower than exhaust gas temperature or engine coolant temperature). The engine remains operating and the electric machine remains in an off state. The thermal energy storage device media temperature begins to increase after the bypass valve change state. The driver continues to request cabin heat.

At time T4, the engine is stopped and the electric machine is activated in response to a low driver demand torque (not shown). Energy from exhaust gases is reduced when the engine is stopped, but some energy may be extracted for a short time after the engine is stopped so the bypass valve state remains at a higher level. The thermal energy storage device media is at a higher level temperature. The cabin heat request remains asserted.

At time T5, the bypass valve changes state in response to engine coolant temperature and the cabin heat request so that energy from the thermal energy storage device may be transferred to the cabin heater (e.g., 333 of FIG. 3). By changing the state of the bypass valve, heat may be provided to the cabin via the cabin heater in response to the cabin heat request even though the engine is stopped. The engine coolant temperature for the example that includes the exhaust heat recovery system 610 remains at a higher level for a longer period of time as compared to the engine coolant temperature for the example without the exhaust heat recovery system 612. By increasing the amount of time engine coolant temperature is at a higher level, the engine may remain stopped for a longer period of time because the cabin heat requirement may be provided even though the engine is stopped.

Thus, thermal energy may be extracted and provided to an exhaust gas heat recovery system so that engine starting and engine stopped time may be improved. A position of a bypass valve may be adjusted to control whether energy is extracted from or supplied to a thermal energy storage device.

Figure 7:
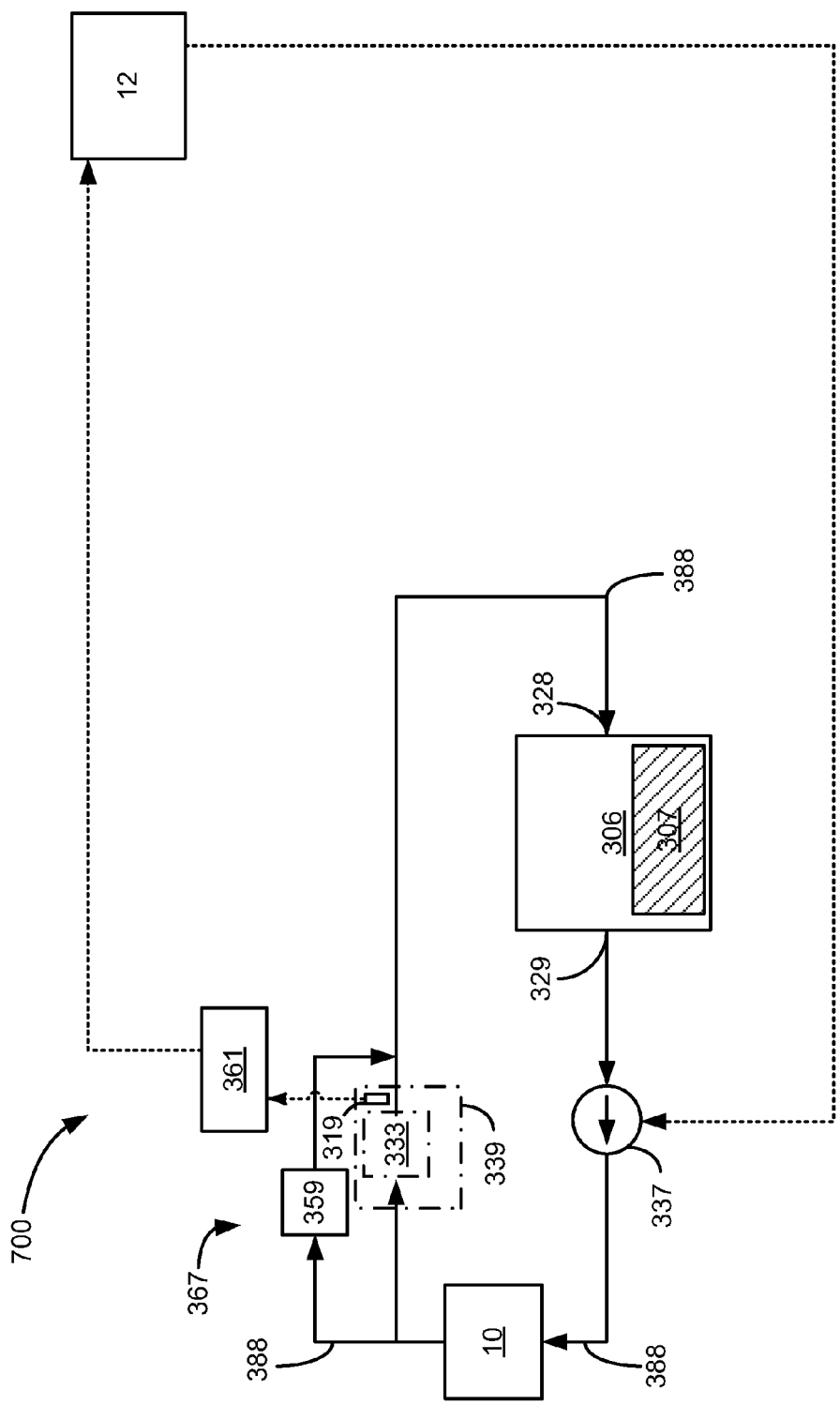
FIG. 7 shows a second example system for recovering engine waste heat and supplying the waste to an engine or cabin heater core of a vehicle.

Referring now to FIG. 7, an alternative system for recovering and utilizing engine waste heat is shown. The method of FIGS. 4 and 5 may be applied to the system of FIG. 7. However, when the method of FIGS. 4 and 5 is applied to the system of FIG. 7, engine waste heat is directed to thermal energy storage device and thermal energy storage media 307 via engine coolant, no exhaust heat exchanger is required. Additionally, valves and pumps may be arranged differently than is shown in FIG. 7 without departing from the scope and intent of the disclosure. The system shown in FIG. 7 may be a lower cost alternative to exhaust gas heat recovery system 151 shown in FIG. 1, or it may be used in conjunction with the exhaust gas heat recover system 151. Electrical control lines are shown as dashed lines while fluidic lines are shown as solid lines.

Engine waste heat recovery system 700 includes engine 10 and engine coolant passages 388. Engine coolant may travel to engine radiator 359 and/or cabin heater core 333 which may be located in cabin 339. Cabin temperature sensor 319 is used by climate control system 361 to determine cabin temperature. Engine coolant may also pass through thermal energy storage device 306 to transfer or receive thermal energy from thermal energy storage media 307. Engine coolant enters energy storage device 306 at inlet 328 and exits at outlet 329. Electrically controlled engine coolant pump 337 may be selectively activated and deactivated to store or retrieve thermal energy from engine 10 to thermal energy storage media 307. In one example, engine coolant pump may be activated when engine 10 is cold and energy storage media 307 is warm to heat engine 10. On the other hand, if engine 10 has been automatically stopped and cabin heat is requested, engine coolant pump 337 may be activated to transfer thermal energy from energy storage media 307 to engine heater core 333. Engine coolant pump 337 may also be activated in response to engine 10 reaching a warmed-up state so that energy storage media 307 may be recharged to a higher temperature. In this way, energy storage media 307 may source thermal energy to engine 10 and heater core 333. Further, energy storage media 307 may sink thermal energy from engine 10.

As will be appreciated by one of ordinary skill in the art, method described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine system, comprising:
an engine of a vehicle, the engine including an exhaust gas heat exchanger positioned along an exhaust system;
a thermal energy storage device in fluidic communication with the exhaust gas heat exchanger;
an engine coolant heat exchanger in thermal communication with the thermal energy storage device;
a bypass valve that directs a working fluid from the thermal energy storage device through the engine coolant heat exchanger or around the engine coolant heat exchanger;
a cabin heater core in fluidic communication with the engine coolant heat exchanger; and
a controller including non-transitory instructions stored in memory to,
responsive to stopping the engine, and while an engine coolant temperature is greater than a threshold temperature, a cabin heating request is present, and an electric machine of the vehicle is activated responsive to a driver demand torque,
control a state of the bypass valve to transfer heat from the exhaust gas heat exchanger to the thermal energy storage device before the engine coolant temperature decreases below the threshold temperature, and then adjust the state of the bypass valve to transfer heat from the thermal energy storage device to the cabin heater core.

2. The engine system of claim 1, where the thermal energy storage device includes a phase changing media that changes between liquid and solid phases.

3. The engine system of claim 2, further comprising a first electrically driven pump in fluidic communication with the exhaust gas heat exchanger and the engine coolant heat exchanger.

4. The engine system of claim 1, further comprising a second electrically driven pump, the second electrically driven pump positioned within an engine cooling circuit that includes the engine, the cabin heater core, and a radiator.

5. The engine system of claim 4, further comprising a valve that is in direct fluidic communication with the engine and the cabin heater core.

6. The engine system of claim 1, wherein the vehicle is propelled by the electric machine when operating the vehicle with both the engine stopped and the electric machine activated responsive to the driver demand torque.

7. The engine system of claim 6, wherein the engine being stopped includes when the engine has stopped rotating.

8. The engine system of claim 1, wherein the state of the bypass valve is adjusted to transfer heat from the thermal energy storage device to the cabin heater core responsive to the cabin heating request.

9. The engine system of claim 1, wherein the vehicle is a hybrid vehicle.

10. The engine system of claim 1, wherein the engine is an internal combustion engine.

* * * * *